(12) United States Patent
Qiu et al.

(10) Patent No.: US 12,546,978 B2
(45) Date of Patent: Feb. 10, 2026

(54) ZOOMING CONTROL DEVICE AND OPTICAL SYSTEM

(71) Applicant: Shphotonics Ltd, Suzhou (CN)

(72) Inventors: Bing Qiu, Suzhou (CN); Lei Sun, Suzhou (CN)

(73) Assignee: Shphotonics Ltd, Suzhou (CN)

( * ) Notice: Subject to any disclaimer, the term of this patent is extended or adjusted under 35 U.S.C. 154(b) by 544 days.

(21) Appl. No.: 18/180,958

(22) Filed: Mar. 9, 2023

(65) Prior Publication Data
US 2023/0288686 A1 Sep. 14, 2023

(30) Foreign Application Priority Data

Mar. 10, 2022 (CN) .......................... 202210232822.7

(51) Int. Cl.
| | |
|---|---|
| *G02B 17/08* | (2006.01) |
| *G02B 5/26* | (2006.01) |
| *G02B 5/30* | (2006.01) |
| *G02F 1/1335* | (2006.01) |
| *G02F 1/137* | (2006.01) |

(52) U.S. Cl.
CPC .......... *G02B 17/0896* (2013.01); *G02B 5/26* (2013.01); *G02B 5/3025* (2013.01); *G02F 1/133528* (2013.01); *G02F 1/133553* (2013.01); *G02F 1/137* (2013.01)

(58) Field of Classification Search
CPC .. G02F 1/133528; G02F 1/0018; G02F 1/137; G02F 1/03; G02F 1/29; G02F 1/292; G02B 5/3025; G02B 5/3033; G02B 5/26; G02B 17/0896; G02B 17/00; G02B 17/08
See application file for complete search history.

(56) References Cited

U.S. PATENT DOCUMENTS

2003/0231688 A1* 12/2003 Takabayashi ........... G02F 1/093
372/20

FOREIGN PATENT DOCUMENTS

WO  WO-2014019399 A1 *  2/2014  ............... G02F 1/21

* cited by examiner

*Primary Examiner* — Jia X Pan
(74) *Attorney, Agent, or Firm* — ANOVA LAW GROUP, PLLC

(57) ABSTRACT

A zooming control device includes a filter assembly, a metalens device spaced apart from the filter assembly, and a polarization selection device between the filter assembly and the metalens device. The filter assembly is configured to select a wavelength of light exiting the filter assembly and includes an optical device having an adjustable refractive index that varies with an electric current applied to the optical device. The polarization selection device is configured to select a polarization state of the light exiting the filter assembly and passing through the polarization selection device.

20 Claims, 1 Drawing Sheet

ZOOMING CONTROL DEVICE AND OPTICAL SYSTEM

CROSS-REFERENCE TO RELATED APPLICATION

This application claims priority to Chinese Application No. 202210232822.7, filed on Mar. 10, 2022, the entire content of which is incorporated herein by reference.

TECHNICAL FIELD

The present disclosure relates to optical imaging and optical integrated device, and, more particularly, to a zooming control device and an optical system having the zooming control device.

BACKGROUND

Zooming devices are commonly used in optical apparatuses that need zooming, such as camera, microscope, telescope, etc. However, an existing zooming device includes multiple lenses and realizes zooming by moving the lenses to change the focal length. Such an adjustment manner is slow in imaging at desired zooming and the imaging quality is poor.

SUMMARY

In accordance with the disclosure, there is provided a zooming control device including a filter assembly, a metalens device spaced apart from the filter assembly, and a polarization selection device between the filter assembly and the metalens device. The filter assembly is configured to select a wavelength of light exiting the filter assembly and includes an optical device having an adjustable refractive index that varies with an electric current applied to the optical device. The polarization selection device is configured to select a polarization state of the light exiting the filter assembly and passing through the polarization selection device.

Also in accordance with the disclosure, there is provided an optical system including a zooming control device. The zooming control device includes a filter assembly, a metalens device spaced apart from the filter assembly, and a polarization selection device between the filter assembly and the metalens device. The filter assembly is configured to select a wavelength of light exiting the filter assembly and includes an optical device having an adjustable refractive index that varies with an electric current applied to the optical device. The polarization selection device is configured to select a polarization state of the light exiting the filter assembly and passing through the polarization selection device.

BRIEF DESCRIPTION OF THE DRAWINGS

FIG. 2 is a schematic diagram of another example zooming control device consistent with

REFERENCE NUMERALS

100 Filter assembly; 120 Optical device; 110 First mirror; 130 Second mirror; 140 Medium layer; 150 Energizing device;
200 Metalens device;
500 Polarization selection device;
600 Light source;
300 First driver; 400 Second driver;
700 Fiber device.

DETAILED DESCRIPTION OF THE EMBODIMENTS

Embodiments are described below in details for a better understanding of the disclosure. It will be apparent, however, to one skilled in the art that the disclosed device can be implemented without these details. Terms such as "system," "device," "unit," and/or "module" used in this disclosure are to distinguish between different components, elements, parts, or assemblies, and they can be replaced by other terms where proper.

In this disclosure, when a device, unit, or module is referred to as being "on," "connected to," or "coupled to" another device, unit, or module, the former can be directly on, connected or coupled to, or communicate with the latter, or there may be intermediate device, unit, or module, unless the context clearly suggests otherwise. As used herein, the term "and/or" includes any and all combinations of one or more of the associated listed items.

The terminology used in the present disclosure is for describing specific embodiments only, and does not limit the scope of the present disclosure. In the present disclosure, terms such as "a", "an", "an," and/or "the" do not necessarily mean singular, and can also include plural, unless the context clearly indicates otherwise. In general, terms such as "include," "comprise," and "contain" suggest the inclusion of clearly listed features, items, steps, operations, elements, and/or components, and do not suggest an exclusive list, while other features, items, steps, operations, elements, and/or components can also be included.

Features and characteristics, methods of operations, functions of relevant elements of structures, combinations of parts, and economies of manufacture of the present application can be better understood with reference to the following description and drawings, which form a part of the disclosure. The drawings are only for the purpose of illustration and description, and are not intended to limit the scope of the present disclosure. The drawings are not necessarily drawn to scale.

Various structural diagrams are used in this disclosure to illustrate various modifications of the embodiments according to the disclosure. The structures are not intended to limit the present disclosure.

Figure 1:
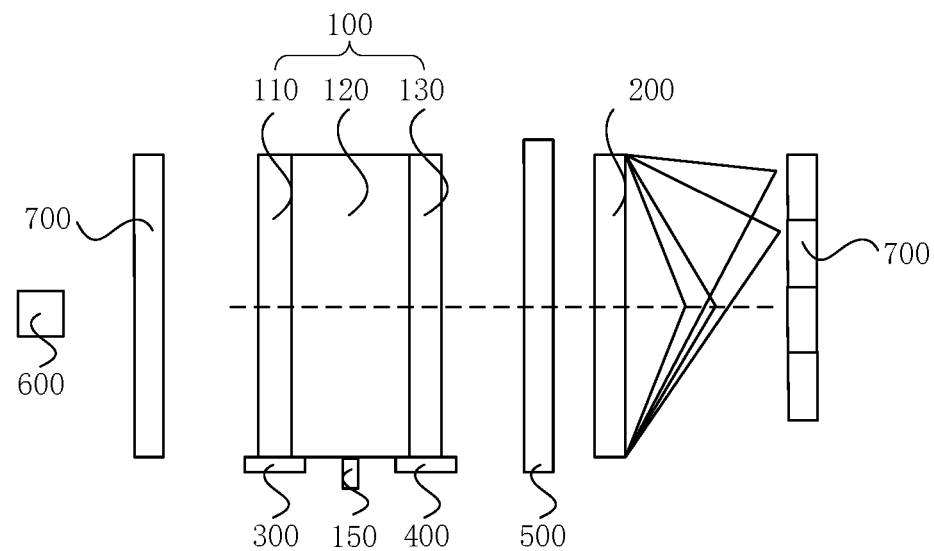
FIG. 1 is a schematic diagram of an example zooming control device consistent with the disclosure.

FIG. 1 is a schematic structural diagram of an example of zooming control devices consistent with the disclosure. As shown in FIG. 1, the zooming control device includes a filter assembly 100, a polarization selection device 500, and a metalens (superlens) device 200. The filter assembly 100 and the metalens device 200 are spaced apart from each other, and the polarization selection device 500 is arranged between the filter assembly 100 and the metalens device 200. The filter assembly 100 is configured to select the wavelength of a target light, and the polarization selection device 500 is configured to select the polarization state of the light from the filter assembly 100. The filter assembly 100 includes at least one optical device 120 that can change the phase of light through electric current. When electric current passes through the at least one optical device 120, the refractive index of the at least one optical device 120 can be changed so that the phase of the light passing therethrough can be changed, and hence the wavelength of the light passing through the filter assembly 100 becomes longer or shorter. The polarization state of the light can be selected through the polarization selection device 500. A metalens (superlens) can have different focal points for different wavelengths and different polarization states. Therefore, the focal length and focal position of the light passing through the metalens device 200 can vary. As such, the imaging speed is faster and the imaging quality is improved at high speeding imaging. Specifically, when a light beam is incident on the filter assembly 100 and exiting the filter assembly 100 to the metalens device 200, the filter assembly 100 can filter unnecessary light, leaving only monochromatic light in a specific wavelength band. Further, when the filter assembly 100 is energized, the refractive index of the optical device 120 of the filter assembly 100 can change, and the wavelength of the light beam exiting the filter assembly 100 can also change. Because a metalens has a strong dispersion function, the focal length and the focal position of the target light that reaches the metalens device 200 can change.

In some embodiments, the optical device 120 includes lithium niobate, potassium dihydrogen phosphate, liquid crystal, optically conductive medium, or optically conductive film. For example, the optical device 120 is made of lithium niobate and passing an electric current to the lithium niobate 120 can change the refractive index of the lithium niobate 120, so that the wavelength of the light exiting the filter component 100 can be changed. Because a metalens has a dispersion function, focal length and focal point of the light incident on the metalens device 200 can be changed. Specifically, after the optical device 120 is energized, the light can undergo birefringence in the optical device 120, such as a lithium niobate crystal, and the polarization state of the light can be selected by the polarization selection device 500. As such, the refractive index for the light can be selected to become larger or smaller. If the polarization direction is selected so that, as the electric current increases, the refractive index becomes larger, then the wavelength of the light after passing through the filter component 100 becomes longer, and the focal length for the light incident on the metalens device becomes shorter. Similarly, as the electric current decreases, the refractive index becomes smaller, the wavelength becomes smaller, and the focal length for the light incident on the metalens device 200 becomes longer.

In some embodiments, as shown in FIG. 1, the filter assembly 100 further includes a first mirror 110 and a second mirror 130, and the at least one optical device 120 is disposed between the first mirror 110 and the second mirror 130. The distance between the first mirror 110 and the second mirror 130 can be adjusted to change the wavelength of the light passing through the filter assembly 100, and change the focal length for the light passing through the metalens device 200.

In some embodiments, as shown in FIG. 1, the zooming control device further includes a first driver 300 and a second driver 400. The first driver 300 is coupled to the first mirror 110 and drives the first mirror 110 to move toward or away from the optical device 120. The second driver 400 is coupled to the second mirror 130 and drives the second mirror 130 to move toward or away from the optical device 120. In some embodiments, as shown in FIG. 1, the zooming control device further includes a light source 600 for emitting light. The light source 600 is spaced apart from the first mirror 110. When the first mirror 110 is controlled to move toward or away from the second mirror 130, the focal length for the light exiting the second mirror 130 and reaching the metalens device 200 becomes longer or shorter. For example, when the first mirror 110 is controlled to move away from the second mirror 130, the focal length for the light exiting the second mirror 130 and reaching the metalens device 200 becomes shorter; and when the first mirror 110 is controlled to move toward the second mirror 130, the focal length for the light exiting the second mirror 130 and reaching the metalens device 200 becomes longer.

In some embodiments, the distance between the first mirror 110 and the optical device 120 can be adjusted, while the distance between the second mirror 130 and the optical device 120 can remain unchanged, to affect the wavelength of the light. In some other embodiments, the distance between the first mirror 110 and the optical device 120 can remain unchanged, while the distance between the second mirror 130 and the optical device 120 can be adjusted, to affect the wavelength of the light. In some other embodiments, both the distance between the first mirror 110 and the optical device 120 and the distance between the second mirror 130 and the optical device 120 can be adjusted, to affect the wavelength of the light. When the light from the light source 600 is incident on the first mirror 110, in some embodiments, the first mirror 110 can be controlled to move away from the second mirror 130. Consequently, the wavelength of the light passing through the filter assembly 100 will also change, e.g., the wavelength of the light becomes longer, and the focal length for the light incident on the metalens device 200 becomes shorter. Similarly, when the first mirror 110 is controlled to move toward the second mirror 130, the wavelength of the light becomes shorter, and the focal length for the light incident on the metalens device 200 becomes longer. In some embodiments, the distance between the first mirror 110 and the optical device 120 remains unchanged, and the second driver 400 drives the second mirror to change the distance between the second mirror 130 and the optical device 120. When the second mirror 130 is controlled to move toward the metalens device 200, the wavelength of the light can become longer, and the focal length for the light incident on the metalens device 200 can become shorter. Similarly, when the second mirror 130 moves toward the optical device 120, the wavelength of the light can become shorter, and the focal length for the light incident on the metalens device 200 can become longer.

In some embodiments, the first driver 300 and the second driver 400 can be motors or electric motors. For example, a motor or electric motor can be used to drive the first mirror 110 to move, so as to adjust the distance between the first mirror 110 and the second mirror 130, thereby changing the wavelength of the light passing through the filter assembly 100. In this way, the distance between the first mirror 110 and the second mirror 130 can be adjusted faster and more accurately, and hence the adjustment of the final wavelength is faster and more accurate, which improves the user experience.

In some embodiments, as shown in FIG. 1, the filter assembly 100 further includes an energizing device 150. The energizing device 150 is coupled to the at least one optical device 120. When the magnitude of the electric current of the energizing device 150 is changed, the refractive index of the at least one optical device 120 changes, so that the focal length for the light exiting the second mirror 130 to the metalens device 200 changes. The energizing device 150 can be coupled to an external electric current, and can adjust the magnitude of the electric current, control the electric current to flow to the optical device 120, and stop the electric current from flowing to the optical device 120.

In some embodiments, the first mirror 110 and the second mirror 130 include pellicle mirrors (half-transmissive-half-reflective mirrors).

Figure 2:
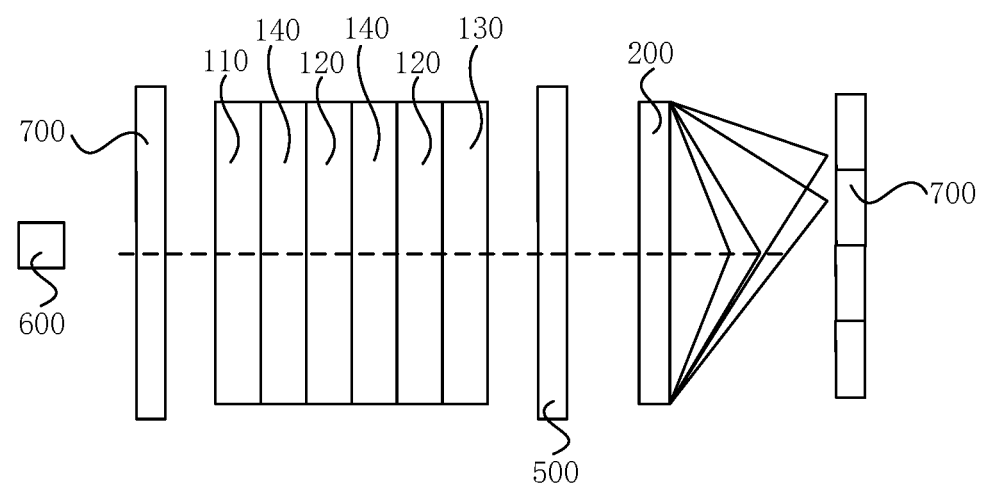

In some embodiments, as shown in FIG. 2, the filter assembly 100 further includes at least one dielectric layer 140 for the grating. The at least one optical device 120 and the at least one dielectric layer 140 are arranged alternately and coupled sequentially. In some embodiments, the at least one dielectric layer 140 and the at least one optical device 120 form a device having the function of a filter. In some embodiments, the optical device 120 can be energized or both the optical device 120 and the dielectric layer 140 can be energized, to change the refractive index for the light incident on the optical device 120 and/or the dielectric layer 140, thereby changing the wavelength of the light and finally changing the focal length for the light.

In some embodiments, as shown in FIGS. 1 and 2, the zooming control device further includes two fiber devices 700, and the filter assembly 100 and the metalens device 200 are located between the two fiber devices 700. In some embodiments, one of the fiber devices 700 can be replaced with a waveguide, or both of the two fiber devices 700 can be replaced with waveguides, to achieve simple coupling effect and optical switch effect.

In some embodiments, when light is incident on the metalens device, the light finally converges to a focal point on an optical axis. As the electric current changes, the focal length on the optical axis also increases or decreases. Because the dispersion of light can include axial dispersion and longitudinal dispersion, the focal point can change along the optical axis or off the optical axis. Thus, in some embodiments, the zooming control device can include a fiber array or a waveguide array. When the electric current changes, due to the longitudinal dispersion, different lights can be incident on different ports of the array, thereby realizing the function of an electronically controlled optical switch or an electronically controlled optical chip.

The components of the zooming control device, such as the filter assembly 100, the polarization selection device 500, the metalens device 200, and the optical waveguides can be arranged at intervals, or can be integrated on one or more devices.

The present disclose also provides an optical system that includes a zooming control device consistent with the disclosure, such as any of the example zooming control devices described above.

The above specific implementation manners are only used to illustrate or explain the principle of the present disclosure, but not to limit the present disclosure. Therefore, any modification, equivalent replacement, improvement, etc., made without departing from the spirit and scope of the present disclosure shall fall within the scope of the present disclosure. Furthermore, the claims are intended to cover all changes and modifications that fall within the scope and metes and bounds, or equivalents of such scope and metes and bounds, of the claims.

What is claimed is:

1. A zooming control device comprising:
   a filter assembly configured to select a wavelength of light exiting the filter assembly, the filter assembly including an optical device having an adjustable refractive index that varies with an electric current applied to the optical device;
   a metalens device spaced apart from the filter assembly; and
   a polarization selection device between the filter assembly and the metalens device, the polarization selection device being configured to select a polarization state of the light exiting the filter assembly and passing through the polarization selection device.

2. The zooming control device of claim 1, wherein:
   the filter assembly further includes a first mirror and a second mirror;
   the optical device is arranged between the first mirror and the second mirror; and
   at least one of the first mirror or the second mirror is configured to move to adjust a distance between the first mirror and the second mirror to change the wavelength of the light exiting the filter assembly.

3. The zooming control device of claim 2, further comprising:
   a light source spaced apart from the first mirror.

4. The zooming control device of claim 3, further comprising at least one of:
   a first driver coupled to the first mirror and configured to drive the first mirror to move toward or away from the optical device; or
   a second driver coupled to the second mirror and configured to drive the second mirror to move toward or away from the optical device.

5. The zooming control device of claim 2, wherein the filter assembly further includes an energizing device coupled to the optical device and configured to apply the electric current to the optical device and change a magnitude of the electric current to change the refractive index of the optical device.

6. The zooming control device of claim 2, wherein at least one of the first mirror or the second mirror includes a pellicle mirror.

7. The zooming control device of claim 1, wherein the filter assembly further includes a dielectric layer coupled to the optical device.

8. The zooming control device of claim 7, wherein:
   the optical device is one of a plurality of optical devices of the filter assembly and the dielectric layer is one of a plurality of dielectric layers of the filter assembly; and
   the plurality of optical devices and the plurality of dielectric devices are arranged alternately and coupled sequentially.

9. The zooming control device of claim 1, wherein the optical device includes lithium niobate, potassium dihydrogen phosphate, liquid crystal, optically conductive medium, or optically conductive film.

10. The zooming control device of claim 1, further comprising:
    two fiber devices;
    wherein the filter assembly and the metalens device are arranged between the two fiber devices.

11. The zooming control device of claim 1, further comprising:
    two waveguides;
    wherein the filter assembly and the metalens device are arranged between the two waveguides.

12. An optical system comprising:
    a zooming control device including:
       a filter assembly configured to select a wavelength of light exiting the filter assembly, the filter assembly including an optical device having an adjustable refractive index that varies with an electric current applied to the optical device;
       a metalens device spaced apart from the filter assembly; and
       a polarization selection device between the filter assembly and the metalens device, the polarization selection device being configured to select a polarization state of the light exiting the filter assembly and passing through the polarization selection device.

13. The optical system of claim 12, wherein:
the filter assembly further includes a first mirror and a second mirror;
the optical device is arranged between the first mirror and the second mirror; and
at least one of the first mirror or the second mirror is configured to move to adjust a distance between the first mirror and the second mirror to change the wavelength of the light exiting the filter assembly.

14. The optical system of claim 13, wherein the zooming control device further includes:
a light source spaced apart from the first mirror.

15. The optical system 14, wherein the zooming control device further includes at least one of:
a first driver coupled to the first mirror and configured to drive the first mirror to move toward or away from the optical device; or
a second driver coupled to the second mirror and configured to drive the second mirror to move toward or away from the optical device.

16. The optical system of claim 13, wherein the filter assembly further includes an energizing device coupled to the optical device and configured to apply the electric current to the optical device and change a magnitude of the electric current to change the refractive index of the optical device.

17. The optical system of claim 13, wherein at least one of the first mirror or the second mirror includes a pellicle mirror.

18. The optical system of claim 12, wherein the filter assembly further includes a dielectric layer coupled to the optical device.

19. The optical system of claim 18, wherein:
the optical device is one of a plurality of optical devices of the filter assembly and the dielectric layer is one of a plurality of dielectric layers of the filter assembly; and
the plurality of optical devices and the plurality of dielectric devices are arranged alternately and coupled sequentially.

20. The optical system of claim 12, wherein the optical device includes lithium niobate, potassium dihydrogen phosphate, liquid crystal, optically conductive medium, or optically conductive film.

* * * * *